United States Patent Office 3,300,454
Patented Jan. 24, 1967

3,300,454
CATALYTIC OXIDE PROCESS
Stephen W. Osborn, Yardley, Pa., assignor to Thiokol Chemical Corporation, Bristol, Pa., a corporation of Delaware
No Drawing. Filed Apr. 1, 1963, Ser. No. 269,722
20 Claims. (Cl. 260—79.7)

This invention relates to the production of polyepisulfides of relatively high molecular weight. The polyepisulfides of the invention may be either homopolymers or interpolymers, depending upon whether one or more than one monomeric episulfide is used as a starting material. The invention also relates to the use of certain metal oxide and oxide-generating catalysts in the polymerization process.

It is an object of the invention to provide a process for making polyepisulfides having high molecular weights. It is another object of the invention to provide novel oxide catalysts adapted to be used in such a polymerization process to produce polyepisulfides having relatively high molecular weights. Other objects of the invention will be in part obvious and in part pointed out hereafter.

It has now been unexpectedly found that certain solid particulate metal oxide salts will effectively catalyze polymerizations of episulfides to form useful high molecular weight polymeric materials.

The oxide compounds, within the concept of the present invention, include substances which generate oxides under the polymerization conditions, such as peroxides. The specific oxides which are usefully employed according to this invention are those of metals in an integer oxidation state i.e., valence, of not greater than IV and which fall into period 3, Groups I-A, II-A and III-A; period 4 Groups I-A, II-A and V-III; period 5, Groups II-A, IV-A and V-A; and period 6, Groups II-A, IV-A and V-A of the periodic table of the elements. Namely, these oxides are $Na_2O$, $Na_2O_2$; $MgO$; $Al_2O_3$; $K_2O$, $K_2O_2$; $CaO$, $CaO_2$; $Fe_2O_3$, $CoO$, $NiO$; $SrO$, $SrO_2$; $SnO$, $SnO_2$; $Sb_2O_3$; $BaO$, $BaO_2$; $PbO$, $PbO_2$ and $Bi_2O_3$. These catalysts may be used singularly or in combination with one another. The catalysts of the present invention are preferably used in a particulate state. It has been found that, generally speaking, the finer the particle size the more reactive is the catalyst. The preferred particle size is of the order of less than one micron. The preferred catalysts are those in which the metal has a valence of two such as $CaO$, $Ca_2O_2$, $MgO$, $BaO$ and $NiO$.

The present process is generally applicable to the polymerization of episulfide monomers. Typical monomeric episulfides polymerizable by this process are styrene sulfide, allylthioglycidyl ether, thioglycidylacrylate, thioglycidyl methacrylate, 3,4-epoxy-1,2-butylene sulfide, vinyl cyclohexene sulfide, butadiene monoepisulfide and alkylene sulfides such as ethylene sulfide, propylene sulfide, butylene sulfide (i.e., 1,2-butylene sulfide, 2,3-butylene sulfide), isobutylene sulfide and cyclohexene sulfide. Mixtures of these monomeric episulfides may also be used as starting materials. In generaly, the polymers and interpolymers produced according to the present invention are insoluble in water and the polymers made entirely or principally from ethylene sulfide are substantially completely insoluble in organic solvents such as benzene, acetone, hexane and methylene chloride. That is, they are soluble to the extent of less than 1% by weight in the solvents.

Homopolymers of ethylene sulfide produced by this process are crystalline solids having relatively high melting points. They are useful as high temperature molding materials and when melted can be formed into flexible films. Interpolymers of ethylene sulfide and monomers such as propylene sulfide and/or butylene sulfide produced by the present process form valuable extrudable materials. When melted, these interpolymers can also be formed into flexible films. Interpolymers can also be made from monomeric mixtures of propylene sulfide and/or butylene sulfide and from 2 to 20% by weight of one or more of allylthioglycidyl ether, thioglycidyl acrylate, thioglycidyl methacrylate, 3,4-epoxy-1,2-butylene sulfide, vinyl cyclohexene sulfide and butadiene monoepisulfides and such interpolymers can be cured by conventional vulcanization techniques to form useful elastomers. Polymers of propylene sulfide and/or butylene sulfide can be made by the present process which are useful elastomeric materials which may be formed into flexible films.

Details of the polymerization process are given in the specific examples set forth below. In general, the polymerization process is executed by bringing the monomeric episulfide or mixture of episulfides into contact with the catalysts described above. It is preferably, in order to obtain optimum results, that the starting monomeric materials be freshly distilled just prior to use from a reducing agent such as calcium hydride to remove oxidation products, carbon dioxide and other impurities. The catalyst is used to the extent of about 0.01 to 10% by weight of the monomeric material to be polymerized, the preferred amount of catalyst being about 0.5 to 5% by weight. The polymerization can be carried out satisfactorily at temperatures of 20° to 100° C., the preferred temperatures being about 60 to 80° C. Depending upon the reaction conditions and the nature of the monomeric material, the reaction may take from a few minutes up to 48 hours or more.

The polymerization reaction may be conducted without using a solvent, as in a bulk process, or any of various inert organic solvents can be used in a solution polymerization process such as aromatic hydrocarbons, e.g., benzene, toluene or xylene; aliphatic hydrocarbons, e.g., isopentane, n-hexane, or octane; or chlorinated hydrocarbons, e.g., carbon tetrachloride, methylene chloride, or ethylene chloride. The solvent is used to help regulate the rate of the reaction, where desired, by aiding in a dissipation of the heat of the reaction. The reaction mixture may be agitated to facilitate reaction. The pressure at which the reaction is carried out does not appear to be particularly critical. Thus the reaction can be conducted in an open vessel at atmospheric pressure or in a closed vessel under autogenous pressure. In modifications of the process wherein a solvent is used, the reaction vessel is desirably charged with solvent, catalyst and monomer, although this particular order of addition is not crtical to the successful practice of this invention.

In order to point out more fully the nature of the present invention, the following specific examples are given of illustrative methods of using the novel catalysts of the present invention. In many of the experiments the polymer product contained physically bound solvent which was removed by evaporation, as in a vacuum oven at elevated temperatures. The following examples are merely illustrative of the present invention and are not intended as a limitation upon the scope thereof.

*Examples 1–9*

Ethylene sulfide monomer was polymerized with various metal oxide and peroxide catalysts to yield solid crystalline polyepisulfide polymers of high molecular weight. Stainless steel polymerization bombs, purged with dry nitrogen gas, were charged with solvent, monomer and catalyst in such quantities as listed below. The space in the bomb above the charged components was filled with nitrogen; the bombs were then sealed and placed into a constant temperature water bath set at 80° C. The vessels were then tumbled for such periods of time as are listed in the table, then removed from the bath, cooled to ambient temperature and unsealed. The pot contents were dumped into beakers, washed with benzene, filtered and dried at 50° C. under vacuum (less than 5 mm. Hg) for about 24 hours. The properties of the polymer products obtained are as listed. The melting ranges, in ° C., for the polymers obtained were determined using a Kofler Micro Hot Stage assembly (as sold by Arthur H. Thomas Co., Philadelphia, Pa.) and a microscope, using a 3° C./minute temperature rise rate. The ranges given extend from those temperatures at which melting starts to those at which melting is complete.

filtered into a vacuum flask. The benzene and unused monomers were removed by water aspiration and heat. The flask contained a small amount of oil. The product was a low molecular weight, curable polymer that could be cured with conventional vulcanizing agents to produce a high molecular weight, crosslinked elastomer.

I claim:

1. A process comprising polymerizing at least one vicinal episulfide monomer under substantially non-alkaline conditions by contacting the monomer with, as a catalyst, at least one metal oxide in which the metal has

| Example | 1 | 2 | 3 | 4 | 5 | 6 | 7 | 8 | 9 |
|---|---|---|---|---|---|---|---|---|---|
| Polymerization Charge Recipe: | | | | | | | | | |
| Ethylene Sulfide, monomer, in g | 25.115 | 25.115 | 25.115 | 25.115 | 25.115 | 25.115 | 25.115 | 25.115 | 25.115 |
| Benzene, solvent, in ml | 100 | 100 | 100 | 100 | 100 | 100 | 100 | 100 | 100 |
| Catalyst, in g.: | | | | | | | | | |
| $Al_2O_3$ | 1.26 | | | | | | | | |
| $CaO_2$ | | 0.89 | | | | | | | |
| NiO | | | | | | | | | 0.89 |
| $SnO_2$ | | | 1.07 | | | | | | |
| $Sb_2O_3$ | | | | 1.87 | | | | | |
| $Na_2O_2$ | | | | | 3.6 | | | | |
| $Fe_2O_3$ | | | | | | 0.96 | | | |
| BaO | | | | | | | 1.97 | | |
| | | | | | | | | 1.88 | |
| Polymerization Conditions: | | | | | | | | | |
| Bath Temperature, in ° C | 80 | 80 | 80 | 80 | 80 | 80 | 80 | 80 | 80 |
| Polymerization Time, in hours | 72 | 72 | 72 | 72 | 72 | 72 | 72 | 72 | 2 |
| Polymer Product: | | | | | | | | | |
| Melting Range, in ° C | 193–197 | 200–206 | 195–204 | 206–216 | 195–250 | 199–225 | 200–204 | 199–202 | 205–211 |
| Yield, in g | 11.5 | 22.2 | 4.8 | 5.5 | 4.1 | 25.3 | 4.8 | 10.9 | 6.7 |

*Example 10*

Two sealable, 30 ounce polymerization bottles were cleaned, dried, flushed with nitrogen and then charged as follows:

| | Bottle Number 1 | Bottle Number 2 |
|---|---|---|
| Calcium oxide, grams | 0.2 | |
| Magnesium oxide, grams | | 0.2 |
| Benzene, ml | 90 | 90 |
| Propylene sulfide, ml | 50 | 50 |

The oxides were reagent grade materials were pre-dried by being heated to red heat for about an hour and stored, prior to use, under dry nitrogen. The benzene was dry and the propylene sulfide was freshly distilled.

The bottles were then sealed and tumbled for about 22 hours in an 80° C. water bath. The bottles were then removed from the bath, cooled to room temperature, opened and the viscous liquid reaction mixture in each bottle was removed. The reaction mixtures were evaporated to dryness in a vacuum oven at 5 mm. Hg at 40° C. to remove solvent and unreacted monomer. Each of the resulting rubbery residues were taken up again in about 200 ml. of dry benzene, allowed to stand overnight in the benezene and each of the resulting clear, supernatant liquids were filtered through #1 whatman paper into two liters of methanol. The precipitated polymers were then washed with fresh methanol and dried under vacuum at 40° C. for 48 hours to constant weight. Yields of 25% and 23%, respectivly, for the CaO and MgO initiated polymers were obtained. When tested for intrinsic viscosity ($\eta$) at 30° C. in chloroform, these polymers showed intrinsic viscosity values of 0.709 and 0.793, respectively.

*Example 11*

To a reaction bomb there was charged 89.7 grams (1.02 moles) of 1,2-butylene sulfide, 23.4 grams (0.18 mole) of allylthioglycidyl ether, 400 ml. of benzene and 0.2 gram of magnesium oxide. The bomb was sealed and placed in an 80° C. water bath for 22 hours. The bomb was then removed from the water bath, allowed to cool to room temperature, and then the contents were a valence not greater than four and which metal is selected from those which fall within Groups I–A, II–A and III–A of period 3; Groups I–A, II–A and VIII of period 4; Groups II–A, IV–A and V–A of period 5 and Groups II–A, IV–A and V–A of period 6 of the periodic table of the elements.

2. A process comprising polymerizing at least one vicinal episulfide monomer under substantially non-alkaline conditions by contacting the monomer with at least one metal oxide selected from the group consisting of $Na_2O$, $Na_2O_2$, MgO, $Al_2O_3$, $K_2O$, $K_2O_2$, CaO, $CaO_2$, $Fe_2O_3$, CoO, NiO, SrO, $SrO_2$, SnO, $SnO_2$, $Sb_2O_3$, BaO, $BaO_2$, PbO, $PbO_2$ and $Bi_2O_3$.

3. A process as in claim 1 in which said episulfide monomer is selected from the group consisting of alkylene sulfides, styrene sulfide, allyl thioglycidyl ether, thioglycidyl acrylate, thioglycidyl methacrylate, 3,4-epoxy-1,2-butylene sulfide, vinyl cyclohexene episulfide and butadiene monoepisulfide.

4. A process as in claim 1 in which the metal in said oxide has a valence of two.

5. A process as in claim 4 in which said oxide is calcium oxide.

6. A process as in claim 4 in which said oxide is magnesium oxide.

7. A process as in claim 4 in which said oxide is barium oxide.

8. A process as in claim 4 in which said oxide is nickel oxide.

9. A process as in claim 4 in which said oxide is calcium peroxide.

10. A process as in claim 2 in which said oxide is aluminum oxide.

11. A process as in claim 2 in which said oxide is sodium peroxide.

12. A process as in claim 2 in which said oxide is ferric oxide.

13. A process as in claim 2 in which said oxide is antimony oxide.

14. A process as in claim 2 in which said oxide is tin oxide.

15. A process as in claim 1 in which at least one of said episulfide monomers is an alkylene sulfide.

16. A process as in claim 15 in which at least one of said episulfide monomers is ethylene sulfide.

17. A process as in claim 15 in which at least one of said episulfide monomers is propylene sulfide.

18. A process as in claim 15 in which at least one of said episulfide monomers is butylene sulfide.

19. A process as in claim 1 in which allyl thioglycidyl ether is interpolymerized with at least one vicinal episulfide monomer selected from the group consisting of propylene sulfide and butylene sulfide.

20. A process as in claim 19 in which allyl thioglycidyl ether is interpolymerized with butylene sulfide.

References Cited by the Examiner

UNITED STATES PATENTS

| | | | |
|---|---|---|---|
| 2,183,860 | 12/1939 | Coltof | 260—79 |
| 2,891,072 | 6/1959 | Remes et al. | 260—327 |

OTHER REFERENCES

Miles et al., "Dithiols, Part XII. The Alkaline Hydrolysis of Acetylated Hydroxy-Thiols: A New Reaction for the Formation of Cyclic Sulphides," J. Chem. Soc. (London), 1952, pages 17–26 (p. 817 especially relied upon). Copy in 260–327.

Ohta et al., "Studies on Ethylene Sulfide I. Polymerizations of Ethylene Sulfide" as reported in Chem. Abs., vol. 51, 1957, p. 14,668.

JOSEPH L. SCHOFER, *Primary Examiner.*

JOSEPH R. LIEBERMAN, *Examiner.*

D. K. DENENBERG, R. A. BURROUGHS,
*Assistant Examiners.*